US011196844B1

(12) United States Patent
Neiman et al.

(10) Patent No.: US 11,196,844 B1
(45) Date of Patent: Dec. 7, 2021

(54) MULTI-PLATFORM SERVICE MANAGEMENT SYSTEM

(71) Applicant: Accenture Global Solutions Limited, Dublin (IE)

(72) Inventors: Bruce Allen Neiman, Canton, GA (US); Jeffrey Lowenthal, Chicago, IL (US); Thomas K. Mahaffey, Jr., San Marcos, TX (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/949,858

(22) Filed: Nov. 17, 2020

(51) Int. Cl.
*H04L 29/06* (2006.01)
*H04L 29/08* (2006.01)
*G06Q 30/02* (2012.01)

(52) U.S. Cl.
CPC ............. *H04L 67/42* (2013.01); *G06Q 30/02* (2013.01); *H04L 67/02* (2013.01); *H04L 67/34* (2013.01); *H04L 67/36* (2013.01)

(58) Field of Classification Search
CPC ......... H04L 67/42; H04L 67/34; H04L 67/02; H04L 67/36; G06Q 30/02
See application file for complete search history.

(56) References Cited

U.S. PATENT DOCUMENTS

| | | | | |
|---|---|---|---|---|
| 6,922,722 B1* | 7/2005 | Mann | ........................ | H04L 67/34 709/217 |
| 7,206,833 B1* | 4/2007 | Sarangam | ............... | H04L 41/06 709/202 |
| 7,318,089 B1* | 1/2008 | Stachura | ............. | H04L 41/0672 709/220 |
| 7,454,459 B1* | 11/2008 | Kapoor | .................. | G06Q 10/06 709/203 |
| 7,499,984 B2* | 3/2009 | Gutjahr | ................. | H04L 41/044 370/328 |
| 2001/0011303 A1* | 8/2001 | Chang | ................... | H04L 51/066 709/227 |
| 2007/0283001 A1* | 12/2007 | Spiess | ..................... | H04L 43/00 709/224 |
| 2009/0150789 A1* | 6/2009 | Regnier | ................. | H04L 67/02 715/736 |
| 2013/0066980 A1* | 3/2013 | Vasters | ................. | H04L 67/325 709/206 |
| 2013/0346596 A1* | 12/2013 | Balakrishnan | ...... | H04L 63/1425 709/224 |

(Continued)

*Primary Examiner* — Alina A Boutah
(74) *Attorney, Agent, or Firm* — Harrity & Harrity, LLP

(57) ABSTRACT

In some implementations, a system may receive, from a client platform, a first report associated with an incident involving a client device that is associated with the client platform. The system may identify, in a mapping, a first management parameter that is mapped to a first client parameter. The system may generate a second report that includes an incident value in association with the management parameter. The system may process the second report to obtain service information associated with the incident. The system may generate a third report that includes the service information, wherein the service information is associated with a second management parameter. The system may identify, based on the mapping, a second client parameter that is mapped to the second management parameter. The system may generate a fourth report that includes the service information in association with the client parameter.

20 Claims, 7 Drawing Sheets

(56) References Cited

U.S. PATENT DOCUMENTS

| | | | | |
|---|---|---|---|---|
| 2017/0048336 | A1* | 2/2017 | Novo Diaz | H04L 67/02 |
| 2017/0126883 | A1* | 5/2017 | Rodriguez | H04L 51/36 |
| 2017/0187583 | A1* | 6/2017 | Beltt | H04L 41/5009 |
| 2019/0007437 | A1* | 1/2019 | Smelker | H04L 63/1425 |
| 2020/0301888 | A1* | 9/2020 | Montgomery | G06F 16/212 |
| 2021/0182703 | A1* | 6/2021 | Velammal | G06N 5/04 |

* cited by examiner

MULTI-PLATFORM SERVICE MANAGEMENT SYSTEM

BACKGROUND

A service management organization may manage information associated with one or more enterprises. The service management organization may receive reports associated with incidents involving the one or more enterprises and/or provide feedback associated with the reports. More specifically, for an information technology-related incident, the service provider may provide troubleshooting steps to address certain technical problems determined from the report.

SUMMARY

In some implementations, a method includes maintaining a data structure that includes a mapping of client parameters associated with a client platform to management parameters; receiving, from the client platform, a first report associated with an incident involving a client device that is associated with the client platform, wherein the first report includes an incident value associated with a first client parameter of the client parameters; identifying, in the mapping, a first management parameter of the management parameters that is mapped to the client parameter; generating a second report that includes the incident value in association with the first management parameter; processing, based on the incident value being associated with the management parameter, the second report to obtain service information associated with the incident; generating, based on processing the second report, a third report that includes the service information, wherein the service information is associated with a second management parameter of the management parameters; identifying, based on the mapping, a second client parameter that is mapped to the second management parameter; generating a fourth report that includes the service information in association with the second client parameter; and providing the fourth report to the client device or the client platform.

In some implementations, a device includes one or more memories; and one or more processors, communicatively coupled to the one or more memories, configured to: receive, from a client platform, a first report associated with an incident involving a client device that is associated with the client platform, identify, based on receiving the first report from the client platform, a mapping that is associated with the client platform, wherein the mapping maps client parameters associated with the client platform with management parameters; identify, in the first report, an incident value associated with a first client parameter of the client parameters; identify, in the mapping, a first management parameter of the management parameters that is mapped to the client parameter; generate a second report that includes the incident value in association with the first management parameter; process, based on the incident value being associated with the management parameter, the second report to obtain service information associated with the incident; and perform an action associated with the service information.

In some implementations, a non-transitory computer-readable medium storing a set of instructions includes one or more instructions that, when executed by one or more processors of a device, cause the device to: receive, from a client platform, a first report associated with the client platform; identify, in a data structure, a mapping that is associated with the client platform, wherein the mapping maps client parameters to management parameters; convert the first report to a second report based on the mapping, wherein the second report includes an incident value, for a first management parameter, that is associated with a first client parameter that is mapped to the first management parameter; process, based on the incident value being associated with the management parameter, the second report to obtain service information associated with the incident; generate, the service information being associated with a second management parameter of the management parameters, a third report that includes the service information; convert, based on the mapping and the second management parameter, a fourth report that includes the service information in association with a second client parameter that is mapped to the second management parameter; and provide the fourth report to the client device or the client platform.

DETAILED DESCRIPTION

Figure 1A:
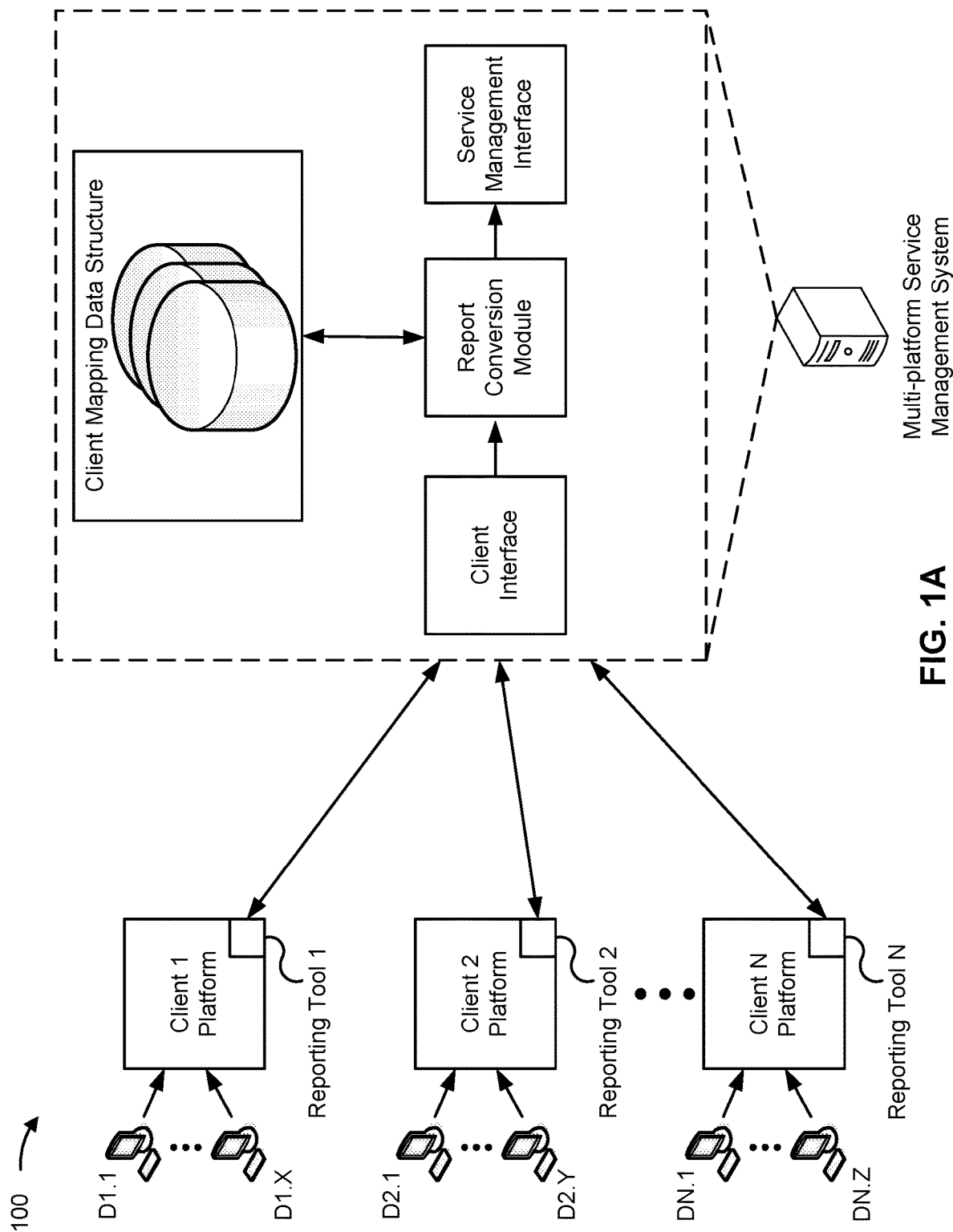
FIGS. 1A-1D are diagrams of an example implementation described herein.

The following detailed description of example implementations refers to the accompanying drawings. The same reference numbers in different drawings may identify the same or similar elements.

A service management organization (e.g., a technical service organization, an information technology (IT) organization, a customer service organization, or the like) can provide a service for multiple enterprises. For example, the service management organization can serve hundreds or thousands of enterprises. Each of these enterprises may utilize and/or be associated with hundreds or thousands of devices (e.g., computers, mobile devices, servers, point of sale (PoS) systems, or the like) in order to operate according to enterprise objectives. Furthermore, these enterprises, served by the service management organization, may utilize different types of reporting systems (e.g., client applications and/or client interfaces) that generate and provide reports to the service management organization. Further, different enterprises (and/or departments of a same enterprise) that use a same reporting system may generate and/or provide reports with various configurations (e.g., configurations that have different sets or types of parameters, different formatting, or the like).

According to previous techniques, a service management system needs to receive individual reports generated by the various reporting systems (and/or in various configurations), manually process the individual reports to interpret the reports and/or convert information from the reports to a serviceable configuration associated with a service platform of the service management organization. Such a service platform may be used to store the data for an enterprise, analyze the information in the reports relative to information in other reports for the enterprise, determine an action to be performed based on the report, or the like. Further, feedback may need to be provided to the various enterprises (and/or the reporting device(s) of the various enterprises) in respective configurations associated with the individual enterprises, which requires conversion from the serviceable configuration to the respective configurations.

According to some implementations described herein, a multi-platform service management system is configured to universally operate with multiple client platforms and/or enterprises. For example, as described herein, the multi-platform service management system may receive client incident reports associated with a variety of client platforms. The multi-platform service management system may process the client incident reports to convert sets of service information (that are in various configurations) into management reports (e.g., in a configuration associated with the multi-platform service management system). The multi-platform service management system may process the management reports to determine and/or provide various services for enterprises associated with the client platforms. For example, the multi-platform service management system may generate, based on the management reports, corresponding service reports. Additionally, or alternatively, the multi-platform service management system may convert the service reports from a configuration associated with the multi-platform service management system to respective configurations of the client platforms that provided the reports.

In this way, the multi-platform service management system, as described herein, may quickly, accurately, and efficiently (e.g., relative to previous techniques) manage information associated with a plurality of different client platforms, thereby conserving computing resources (e.g., processor resources, memory resources, used to operate separate systems associated with the client platforms, and/or the like) and/or network resources (e.g., by reducing a number of communications and/or inquiries associated with utilize multiple separate systems for the different client platforms). Furthermore, implementations described herein use a rigorous, scalable computerized process (e.g., in association with and/or for hundreds, thousands, millions, or more types of reports, parameters of reports, or the like) to perform tasks or roles (e.g., simultaneously on the thousands, millions, or more types of reports, parameters of reports, or the like) that were not previously performed. For example, previously, a technique did not exist to receive various types of reports with various types of parameters, convert parameters of the various reports to corresponding management parameters of a multi-platform service management system, generate a management report based on the management parameters. Furthermore, a process for managing information associated with a plurality of different client platforms, as described herein, conserves computing resources (e.g., processor resources, memory resources, and/or the like) that would otherwise be wasted in attempting to manually operate separate systems associated with the client platforms to convert parameters of the various reports to corresponding management parameters of a multi-platform service management system, and generate a management report based on the management parameters.

Figure 1B:
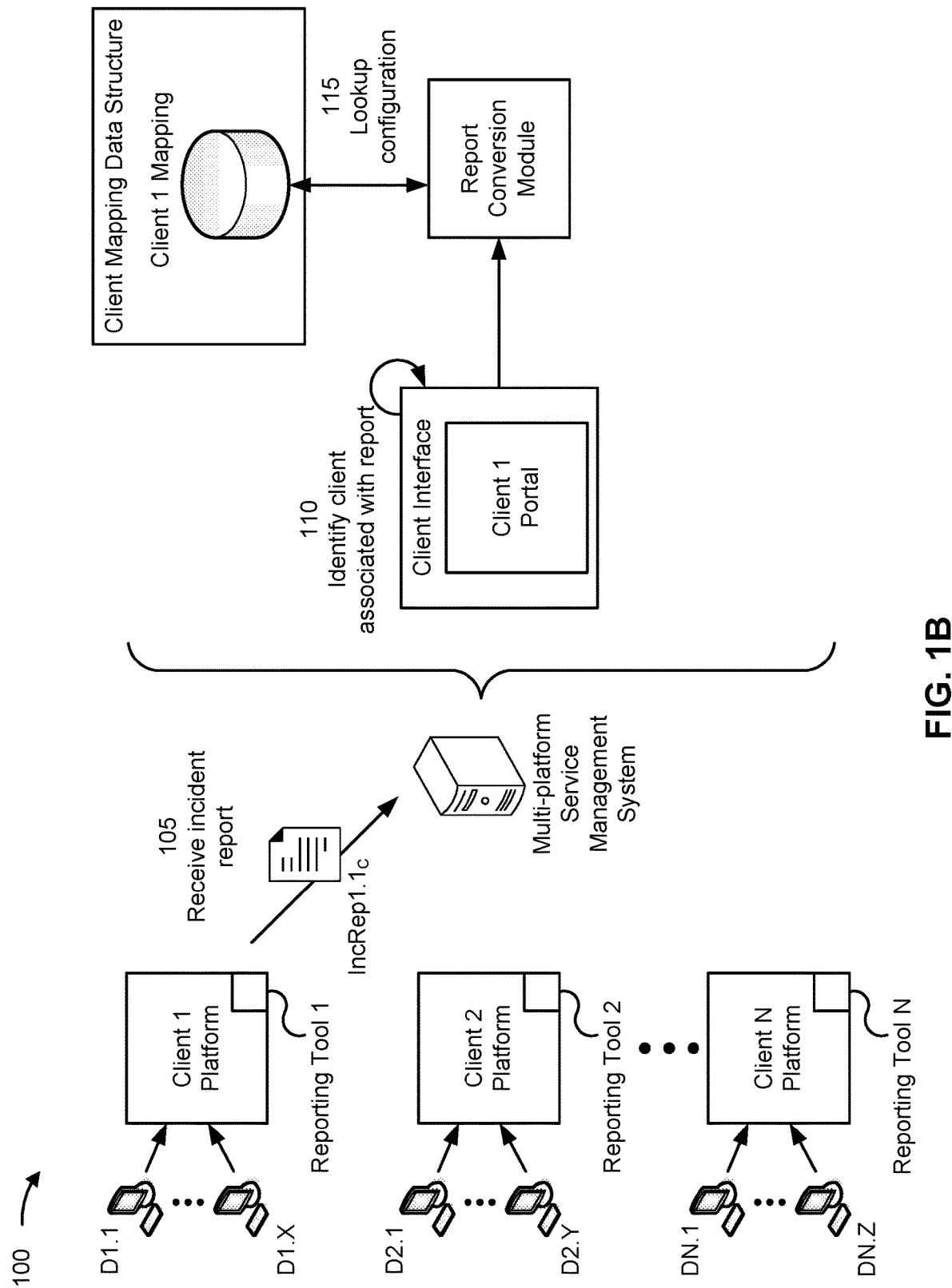

FIGS. 1A-1D are diagrams of an example 100 associated with managing services associated with a plurality of platforms. As shown in FIGS. 1A-1B, example 100 includes N client platforms (N≥1) (shown as and referred to herein individually as "Client Platform 1," "Client Platform 2," to "Client Platform N," and referred to herein collectively as "client platforms"), a plurality of devices (shown as "D1.1" to "D1.X" coupled to Client Platform 1, "D2.1" to "D2.Y" to "D2.X" coupled to Client Platform 2, and "DN.1" to "DN.Z" coupled to Client Platform N), and a multi-platform service management system. The client platforms may be associated with different enterprises, individuals, and/or organizations that are configured to receive a service provided by the multi-platform service management system and/or by a service management organization associated with the multi-platform service management system.

As shown in FIG. 1A, the client platforms include respective reporting tools (shown as "Reporting Tool 1" to "Reporting Tool N" and referred to herein collectively as "reporting tools"). The respective reporting tools may be different applications, application programming interfaces (APIs), or the like that generate incident reports that are used to manage the client systems and/or monitor the client systems. The reporting tools may be preconfigured to specifically operate according to client-specific settings of the respective client platforms, according to client-specific parameters of the respective client platforms, according to client-specific formatting of the respective client platforms, or the like.

The multi-platform service management system is configured to manage information associated with the client platforms based on incident reports received from the client platforms and/or the reporting tools. The incident reports may be generated by one or more of the client devices based on corresponding incidents involving the client devices. As shown in FIG. 1A, the multi-platform service management system includes a client interface, a report conversion module, a client mapping data structure, and a service management interface. Such incidents may be associated with any type of event, such as a technology-related event, a business-related event (e.g., an event associated with certain departments of an enterprise, such as a human resources department, an IT department, an operations department, or a sales department, among other examples), a legal event, a transactional event, or the like. The client interface may include one or more of an API of the multi-platform service management system, a portal (e.g., an online portal or web-based portal) of the multi-platform service management system, a routing interface of the multi-platform service management system, and/or the like. In some implementations, the client interface may include client-specific APIs and/or client-specific portals that are individually associated with specific, respective client platforms.

The client mapping data structure may include client-specific mappings associated with the client platforms. For example, for one or more of the client platforms, the multi-platform service management system may maintain a corresponding mapping of client parameters associated with a client platform to management parameters that are associated with the multi-platform service management system. The client parameters may be associated with client-specific configurations that are associated with corresponding client platforms. The management parameters may be associated with a management configuration for management-based reports that correspond to incident reports from the client platforms. The management configuration permits the multi-platform service management system to process the management reports, as described herein.

As described herein, the multi-platform service management system may receive the incident reports via the client interface and convert (using the report conversion module and/or the client mapping data structure) the incident reports into corresponding management-based incident reports that can be automatically managed by the multi-platform management system. The multi-platform service management system, via the service management interface, may store, process, track, analyze, and/or transmit (e.g., to a service representative device) the management-based incident reports in accordance with one or more services provided by the multi-platform service management system. Additionally, or alternatively, the multi-platform service management system, based on the provided service, may generate management-based service reports associated with provided services, convert the management-based service reports (e.g., via the report conversion module and/or the client mapping data structure) to client-specific service reports (e.g., that are in client-specific configurations associated with the respective client platforms) and provide the client-specific service reports to the client platforms and/or one or more of client devices of the client platforms (e.g., a client device that generated the incident report, client devices associated with the client device that generated the incident report, or the like).

In this way, the multi-platform service management system, as described herein, may manage information associated with enterprises associated with the client platforms and provide client-specific service reports associated with client-specific incident reports received from the client platforms. Accordingly, rather than include individual, separate client management systems for the client platforms, the multi-platform service management system may utilize a single architecture, and, correspondingly, a single set of computing resources to manage multiple client platforms that utilize and/or provide a variety of different types of the incident reports with a variety of different types of client parameters.

As shown in FIG. 1B, and by reference number 105, the multi-platform service management system receives an incident report. For example, as shown, the multi-platform service management system may receive a client-specific incident report that is associated with Client Platform 1. The multi-platform service management system may receive the incident report via a portal associated with and/or dedicated to Client Platform 1 (shown as "Client 1 Portal"). The portal may be accessible via a link (e.g., a uniform resource locator (URL)) and/or designated for use by the Client Platform 1 and/or client devices D1.1 to D1.X (e.g., as a preconfigured portal that is dedicated to Client Platform 1).

In connection with example 100, the incident report may be associated with an IT incident involving client device D1.1. For example, a user of client device D1.1 may generate the client-specific incident report using Reporting Tool 1 based on a error associated with an operation of client device D1.1. The user may provide the client-specific incident report via the Client 1 Portal (e.g., via an upload). With reference to this example, the multi-platform service management system may be configured to troubleshoot the error and/or determine information associated with the error according to the examples described herein. Other example types of incidents, incident reports, or the like may similarly apply as described herein.

The incident report may be received in a JavaScript object notation (JSON) format (e.g., as a JSON) file and/or may be received in an extensible markup language (XML) format (e.g., as an XML, file). Correspondingly, the incident report may include one or more values (referred to herein as "incident values") that are associated with client parameters that are associated with Client Platform 1. The client parameters may be preconfigured for one or more types of incidents (e.g., according to client-specific settings of Client Platform 1) and associated with respective JSON attributes of a JSON file and/or XML attributes of an XML file. Referring to the above example, the client parameters may be associated with certain operating parameters (e.g. processing speed, available processing resources, memory usage, or the like) of client device D1.1 at the time of the incident. Correspondingly, a JSON attribute and/or an XML attribute associated with a client parameter may be included within the incident report in association with an incident value of the client parameter.

In this way, the multi-platform service management system may receive a client-specific incident report from a client platform to permit the multi-platform service management system to identify the client platform and process the client-specific incident report based on a mapping associated with the client platform.

As further shown in FIG. 1B, and by reference number 110, the multi-platform service management system, via the client interface, identifies the client platform that is associated with the incident report. For example, based on which client portal the multi-platform service management system receives the incident report (Client Portal 1 in example 100), the multi-platform service management system may identify Client Platform 1 as being associated with the report. Additionally, or alternatively, the multi-platform service management system may identify that the incident report is associated with Client Platform 1 based on the incident report including an identifier (e.g., a name, an account number, a logo, or the like) of the Client Platform 1, based on a source address of a communication that includes the incident report (e.g., a media access control (MAC) address of client device D1.1, an Internet protocol (IP) address of client device D1.1 and/or Client Platform 1, and/or the like), among other example indicators associated with Client Platform 1.

In this way, the multi-platform service management system may determine and/or identify that the incident report is associated with a particular client platform (Client Platform 1) to permit the multi-platform service management system to identify a mapping that is associated with the client platform.

As further shown in FIG. 1B, and by reference number 115, the multi-platform service management system, via the report conversion module, looks up a configuration of the incident report in a mapping of the client mapping data structure. The client mapping data structure may include a table, an index, a database, a graph, or any other suitable data storage structure. The client mapping data structure may include a plurality of mappings (e.g., N mappings) that are associated with the client platforms of example 100. Accordingly, the multi-platform service management system may look up the mapping for Client Platform 1 to select the mapping from the plurality of mappings. The multi-platform service management system may select the mapping based on an identifier of Client Platform 1 and/or the mapping being identified by and/or associated with the identifier of the Client Platform 1.

As described herein, the mapping maps client parameters associated with Client Platform 1 with management parameters of the multi-platform service management system. Accordingly, when the incident report is a JSON file and/or in a JSON format, the client parameters may correspond to a preconfigured set of JavaScript object notation (JSON) incident attributes associated with incident reports of Reporting Tool 1 of Client Platform 1. In such an example, the management parameters may include a preconfigured set of JSON service attributes associated with service reports of a service management interface. Additionally, or alternatively, when the incident report is an XML file and/or in an XML format, the client parameters may correspond to a preconfigured set of JSON incident attributes associated with incident reports of Reporting Tool 1 of the Client Platform 1. In such a case, the management parameters may include a preconfigured set of XML service attributes associated with service reports of the service management interface.

In this way, the multi-platform service management system may look up a client-specific mapping associated with Client Platform 1 to permit the multi-platform service management system to generate a management-based incident report associated with the received incident report.

Figure 1C:
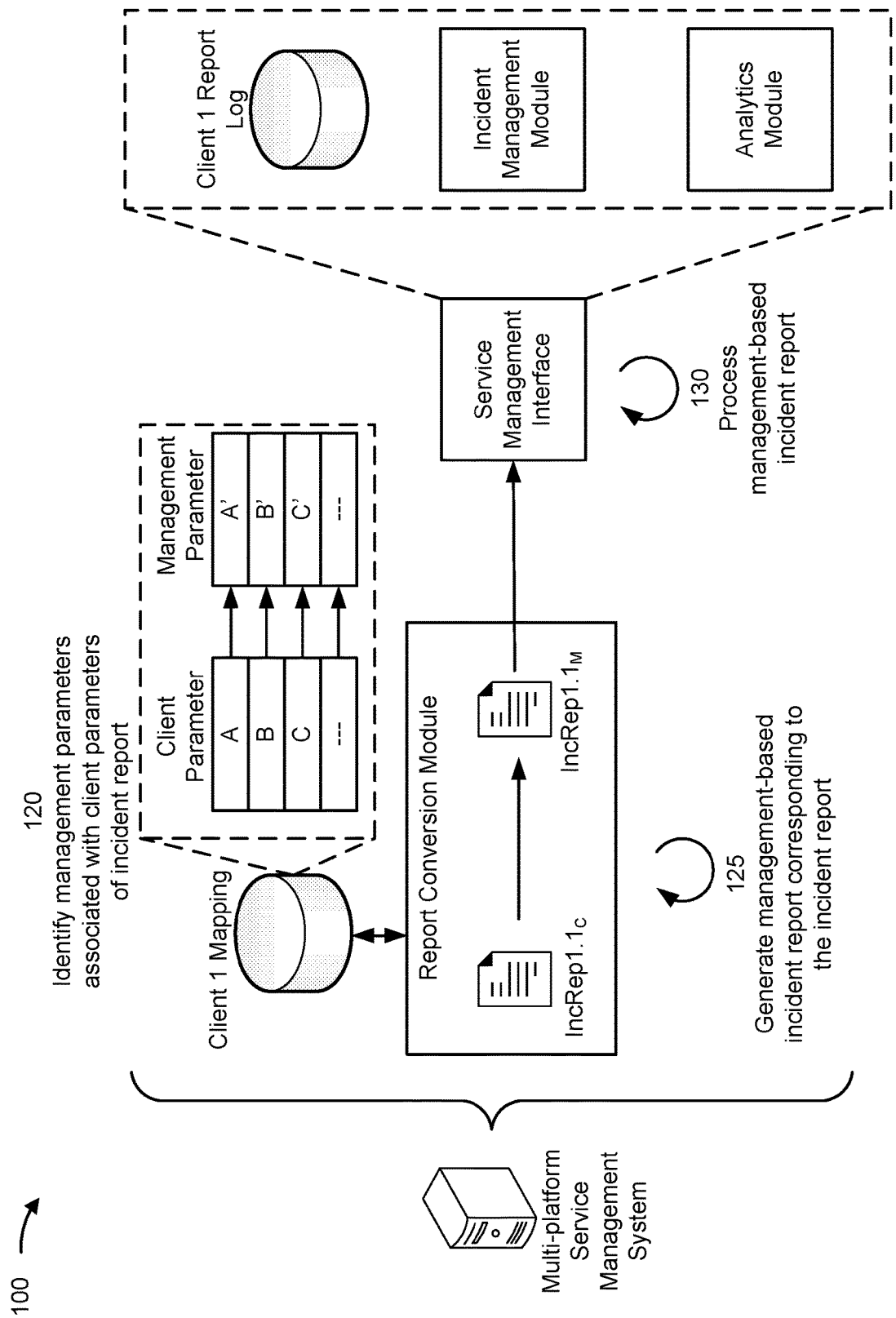

As shown in FIG. 1C, and by reference number 120, the multi-platform service management system, via the report conversion module, identifies management parameters that are associated with client parameters of the incident report. For example, the multi-platform service management system may analyze the incident report to identify client parameters using any suitable technique (e.g., a JSON processing protocol, an XML processing protocol, text recognition, optical character recognition, or the like). As described herein, based on identifying the client parameters, the multi-platform service management system may identify corresponding management parameters that are associated with the client parameters in Client 1 mapping (e.g., via a look up operation, indexing, and/or the like).

In this way, the multi-platform service management system may identify client parameters of the incident report and/or determine management parameters associated with the incident report to permit the multi-platform service management system to generate a management-based incident report associated with the received incident report.

As further shown in FIG. 1C, and by reference number 125, the multi-platform service management system, via the report conversion module, generates a management-based report that corresponds to the incident report. For example, the multi-platform service management system may convert the incident report to a management-based incident report. More specifically, based on incident values associated with the client parameters, the multi-platform service management system may generate the management-based incident report to include the incident values in association with the management parameters that correspond to the client parameters (e.g., the management parameters that are mapped to the client parameters in the Client 1 Mapping).

Referring to the example of above involving an IT incident, one of the client parameters A, B, and/or C may be associated with the one more operating parameters of the client device D1.1. The incident values may correspond to the values of the operating parameters. Accordingly, the incident values may be reconfigured from the client parameters A, B, and C to a management configuration associated with the management parameters A', B', and C'.

To generate the report, the report conversion module may identify the incident values that are associated with the client parameters, extract the incident values, and/or transfer the incident values into a management-based incident report in association with the management parameters. For example, the report conversion module may extract the incident values from fields associated with the client parameters and insert the incident values into corresponding fields of the management parameters.

In this way, the multi-platform service management system may generate a management-based incident reports from incident reports received from a variety of different client platforms. The management-based incident reports may be in a management configuration that permits the multi-platform service management system to process the management-based incident reports in order to provide a service based on incidents.

As further shown in FIG. 1C, and by reference number 130, the multi-platform service management system, via the service management interface, processes the management-based report. As shown, the service management interface may include and/or be associated with one or more logs associated with the client platforms, an incident management module, and an analytics module. The service management interface may process the management-based incident report using any suitable technique (e.g., a JSON protocol, XML, protocol, or the like). For example, the service management interface may include a model that is configured to process the management-based incident report based on the management parameters and corresponding incident values of the management parameters.

In some implementations, the multi-platform service management system may store, via an incident management module, the management-based incident report in a log associated with Client Platform 1 (shown as "Client 1 Report Log"). For example, in association with managing information associated with Client Platform 1, the multi-platform service management system may store the management-based incident report in the Client 1 Report Log to track occurrences of incidents associated with Client Platform 1 and/or incidents associated with client devices of Client Platform 1. As described herein, the multi-platform service management system may perform one or more services associated with the management-based incident reports and respective logs of client platforms.

The service management interface, via the incident management module, may process the management-based incident report to determine a type of service that is to be provided for the incident. In some implementations, a management parameter (and corresponding incident value of the management parameter) may identify the type of service. Accordingly, the management-based incident report may specify a type of service that is to be provided based on the incident report. Additionally, or alternatively, the service management interface may identify a type of one or more of the management parameters (and/or a management parameter that includes an incident value that identifies a type of the incident) and determine the type of service based on the type of the management parameter. Referring to the example above, if a management parameter indicates that the incident is associated with a failure of the client device D1.1, the service management interface may process the management-based incident report to troubleshoot the failure, to determine whether the failure is associated with a trend involving other devices of Client Platform 1, and/or the like. Furthermore, the service management interface may process the management-based incident report based on the incident value that is associated with the management parameter to determine the type of service that is to be performed. Referring to the example above, if the incident value identifies a particular type of error (e.g., error code), the service management interface may process the management-based incident report to determine service information associated with the particular type of error. In this way, the multi-platform service management system may process the management-based incident report to determine one or more actions that are to be performed to provide a service to Client Platform 1 based on the received incident report.

In some implementations, the service management interface, via the incident management module, may be configured to identify and/or determine troubleshooting instructions associated with addressing an incident (e.g., the incident involving the client device D1.1). Referring to the example above, based on an error code and/or operating parameter values in the management-based incident report, the service management interface may identify historical data associated with historical incidents associated with Client Platform 1 (e.g., historical incidents associated with one or more of the client devices that involved the error code and/or similar operating parameter values). For example, the service management interface may perform an analysis (e.g., a similarity analysis) to compare the error code and/or incident values of the management-based incident report to the records in the Client 1 Record Log to identify the historical incidents (and/or historical data) that are associated with the incident. Based on the historical data and/or previously provided service information that was determined to address the historical incidents, the service management interface may determine and/or generate service information that includes the troubleshooting instructions. As described herein, the troubleshooting instructions may be provided to Client Platform 1 and/or client device D1.1 to address the incident associated with the incident report.

According to some implementations, the service management interface, via the analytics module, may be configured to determine analytics based on the management-based incident report (e.g., statistics associated with occurrences of incidents that are associated with the incident). For example, the analytics module may be configured to identify analytics data associated with occurrences of the incident by the client device D1.1 and/or by one or more of the other client devices that are associated with Client Platform 1. Additionally, or alternatively, the analytics module may determine, based on the records in the Client 1 Report Log, analytics data associated with the occurrences of the incident. As described herein, the analytics data may be provided to Client Platform 1 and/or client device D1.1 to provide analytics information associated with the incident. In some implementations, the service management interface may configure the service information to include an alert associated with the analytics data to notify a manager and/or an operator of Client Platform 1 of the incident or the analytics data associated with the incident.

In some implementations, the incident management module is associated with an operator interface that is configured to permit a user of the multi-platform service management system to analyze the management-based incident report and/or provide service information associated with the incident based on the management-based incident report.

In this way, the multi-platform service management system may process the management-based incident report in association with providing a service for Client Platform 1 based on the incident report.

Figure 1D:
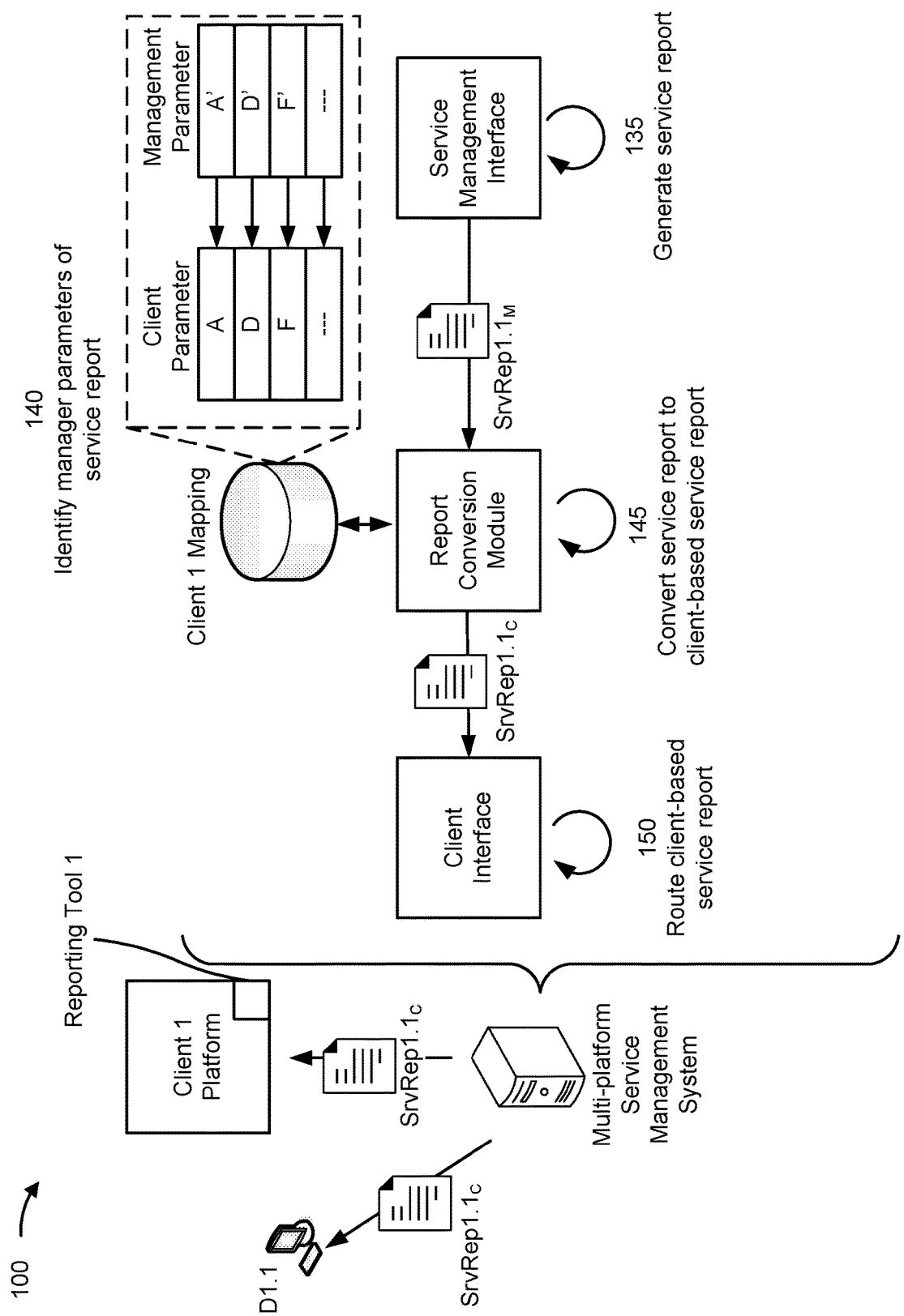

As shown in FIG. 1D, and by reference number 135, the multi-platform service management system, via the service management interface, generates a service report. For example, the service management interface may generate the service report based on the service performed (and/or performance of one or more actions associated with providing the service). The service report may be generated according to a management configuration. Accordingly, the service report may include service information that is configured in association with one or more of the management parameters associated with the multi-platform service management system. As an example, the one or more management parameters may be associated with providing troubleshooting instructions, analytics data and/or information, alerts, and/or the like.

In this way, the multi-platform service management system may generate a service report that is associated with the incident report.

As further shown in FIG. 1D, and by reference number 140, the multi-platform service management system, via the report conversion module, may identify client parameters that are associated with management parameters of the service report. For example, similar to identifying management parameters that are mapped to client parameters in an incident report, as described herein, the report conversion module may look up the management parameters in the Client 1 Mapping to identify client parameters that are mapped to the management parameters of the service report.

In this way, the multi-platform service management system may identify client parameters to permit the multi-platform service management system to generate a client-based service report that is associated with the service report.

As further shown in FIG. 1D, and by reference number 145, the multi-platform service management system, via the report conversion module, converts the service report to a client-based service report. The client-based service report may be in a client-specific configuration associated with Client Platform 1. For example, similar to generating the management-based incident report based on the incident report, as described herein, the report conversion module may generate the client-based service report based on the service information in the service report and the client parameters that are mapped to the management parameters of the service report.

In this way, the multi-platform service management system may generate a client-based service report that is configured specifically for a client platform (e.g., Client Platform 1), to permit the client platform to receive the service information that is associated with the incident and/or automatically perform one or more actions based on the service information being provided in the client-based service report.

As further shown in FIG. 1D, and by reference number 150, the multi-platform service management system, via the client interface, routes the client-based service report. For example, the multi-platform service management system may route the client-based service report to Client Platform 1 and/or client device D1.1 (based on client device D1.1 providing the incident report and the service report identifying client device D1.1). In some implementations, the multi-platform service management system may provide the client-based service report via the Client 1 Portal and/or may use one or more other protocols to provide the client-based report (e.g., an application specific protocol associated with Reporting Tool 1, a communication or messaging protocol, or the like).

In this way, the multi-platform service management system may receive incident reports in various formats, convert the incident reports to a management configuration that can be processed by the multi-platform service management system, process the incident reports based on the management configuration in association with performing a service, and provide client-specific service reports based on the service. Accordingly, a single management system can be configured to automatically serve multiple client platforms that utilize different types of reporting tools, different types of parameters, and/or different types of formatting, rather than separate, individual systems associated with the reporting tools and/or multiple client platforms.

As indicated above, FIGS. 1A-1D are provided as examples. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
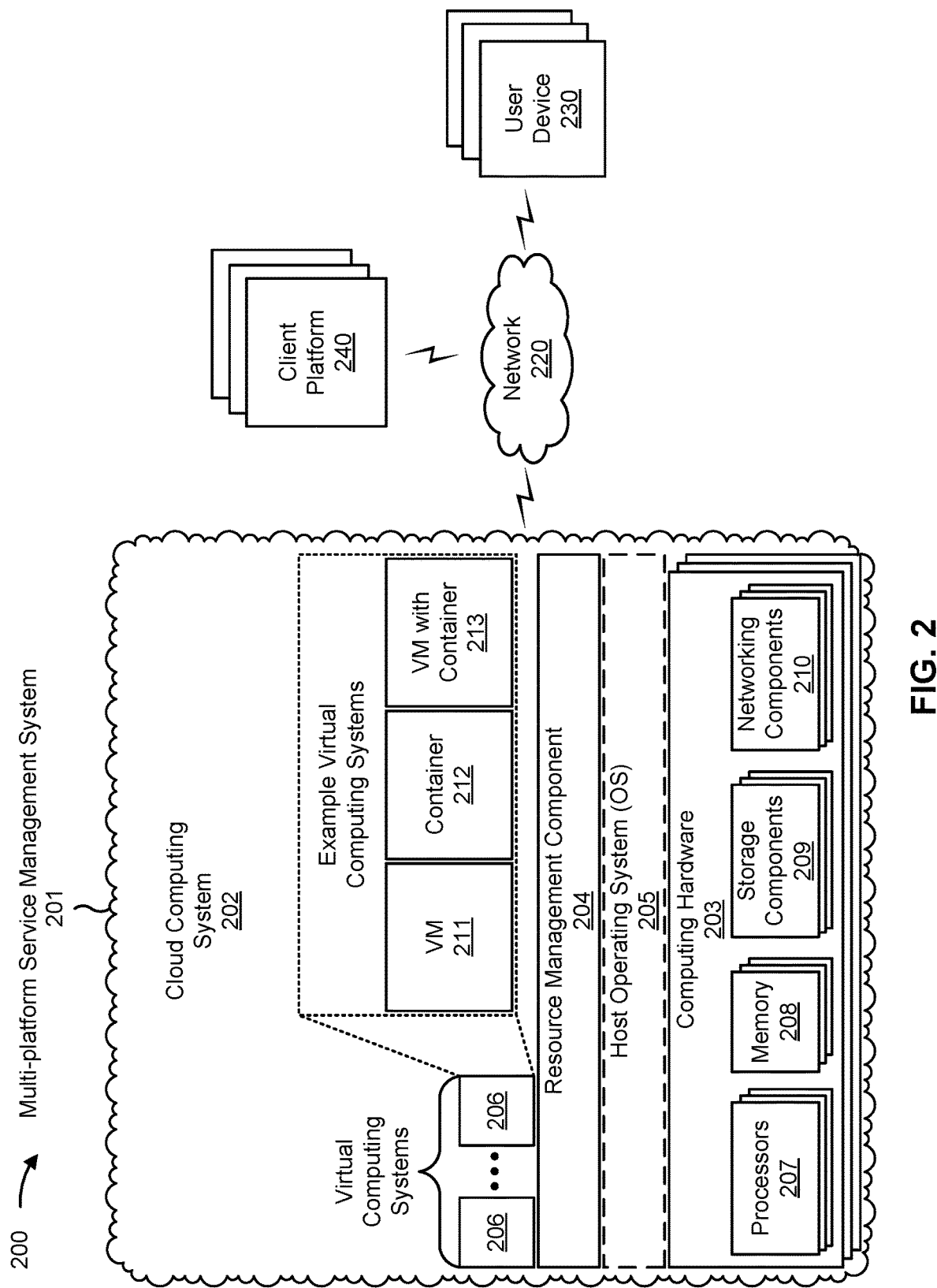
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a multi-platform service management system 201, which may include one or more elements of and/or may execute within a cloud computing system 202. The cloud computing system 202 may include one or more elements 203-213, as described in more detail below. As further shown in FIG. 2, environment 200 may include a network 220, one or more user devices 230 (referred to herein individually as "user device 230", and collectively as "user devices 230s"), and/or one or more client platforms 240 (referred to herein individually as "client platform 240", and collectively as "client platform 240s"). Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the multi-platform service management system 201 may include one or more elements 203-213 of the cloud computing system 202, may execute within the cloud computing system 202, and/or may be hosted within the cloud computing system 202, in some implementations, the multi-platform service management system 201 may not be cloud-based (e.g., may be implemented outside of a cloud computing system) or may be partially cloud-based. For example, the multi-platform service management system 201 may include one or more devices that are not part of the cloud computing system 202, such as device 300 of FIG. 3, which may include a standalone server or another type of computing device. The multi-platform service management system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

The user device 230 includes one or more devices capable of receiving, generating, storing, processing, and/or providing information associated with incident reports and/or managing incident reports, as described elsewhere herein. The user device 230 may include a communication device and/or a computing device. For example, the user device 230 may include a wireless communication device, a mobile phone, a user equipment, a laptop computer, a tablet computer, a desktop computer, or a similar type of device.

The client platform 240 includes one or more devices capable of receiving, generating, storing, processing, providing, and/or routing information associated with generating incident reports and/or providing service reports, as described elsewhere herein. The server device 240 may include a communication device and/or a computing device. For example, the server device 240 may include a server, such as an application server, a client server, a web server, a database server, a host server, a proxy server, a virtual server (e.g., executing on computing hardware), or a server in a cloud computing system. In some implementations, the server device 240 includes computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
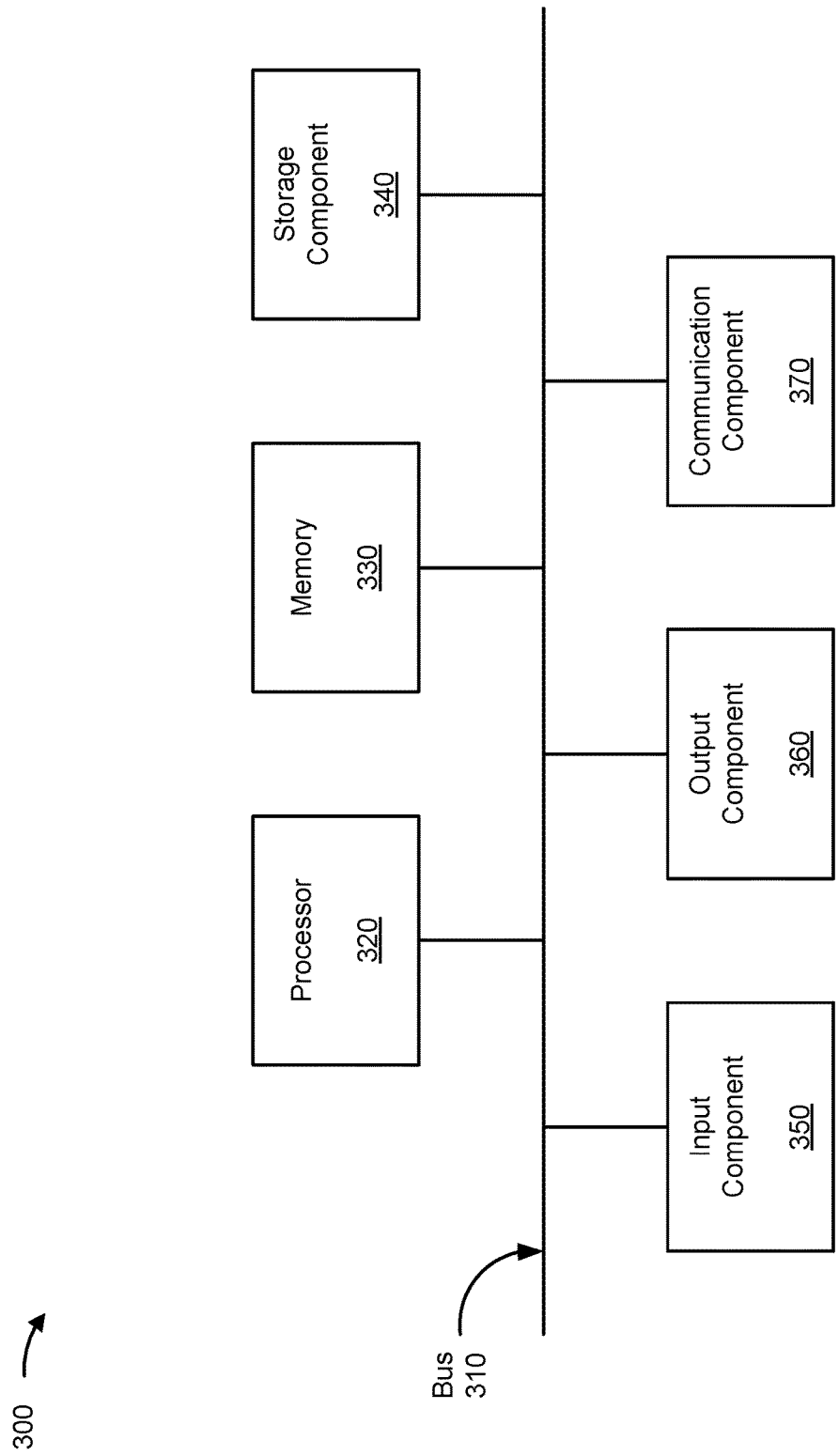
FIG. 3 is a diagram of example components of one or more devices of FIG. 2.

FIG. 3 is a diagram of example components of a device 300, which may correspond to multi-platform service management system 201, user device 230, and/or client platform 240. In some implementations, multi-platform service management system 201, user device 230, and/or client platform 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
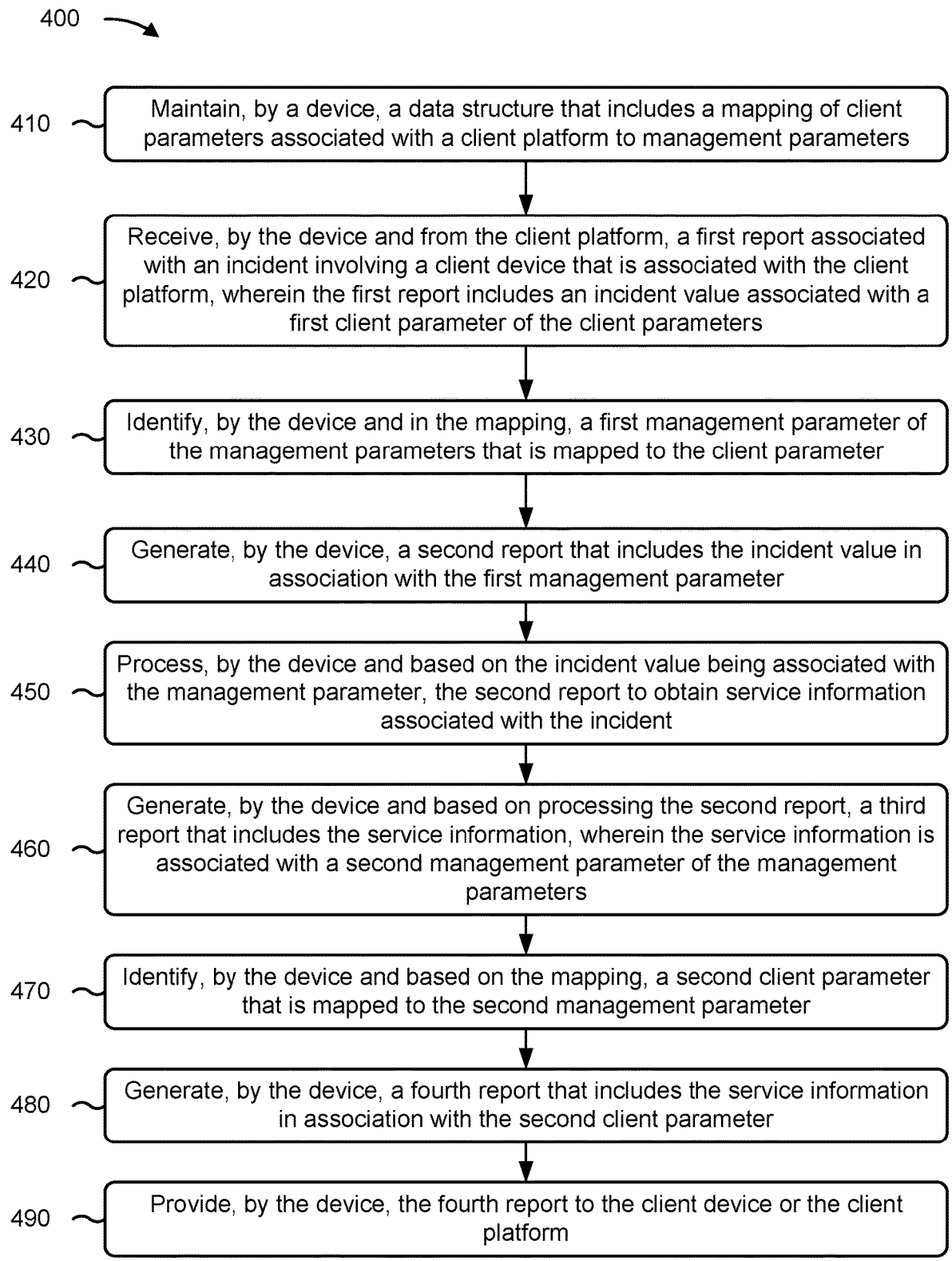
FIG. 4 is a flowchart of an example process associated with managing services associated with a plurality of platforms.

FIG. 4 is a flowchart of an example process 400 associated with managing services associated with a plurality of platforms. In some implementations, one or more process blocks of FIG. 4 may be performed by a multi-platform service management system (e.g., multi-platform service management system 201). In some implementations, one or more process blocks of FIG. 4 may be performed by another device or a group of devices separate from or including the multi-platform service management system, such as a client device (e.g., user device 230), and/or a client platform (e.g., client platform 240). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include maintaining a data structure that includes a mapping of client parameters associated with a client platform to management parameters (block 410). For example, the multi-platform service management system may maintain a data structure that includes a mapping of client parameters associated with a client platform to management parameters, as described above.

As further shown in FIG. 4, process 400 may include receiving, from the client platform, a first report associated with an incident involving a client device that is associated with the client platform, wherein the first report includes an incident value associated with a first client parameter of the client parameters (block 420). For example, the multi-platform service management system may receive, from the client platform, a first report associated with an incident involving a client device that is associated with the client platform, wherein the first report includes an incident value associated with a first client parameter of the client parameters, as described above. In some implementations, the first report includes an incident value associated with a first client parameter of the client parameters.

As further shown in FIG. 4, process 400 may include identifying, in the mapping, a first management parameter of the management parameters that is mapped to the client parameter (block 430). For example, the multi-platform service management system may identify, in the mapping, a first management parameter of the management parameters that is mapped to the client parameter, as described above.

As further shown in FIG. 4, process 400 may include generating a second report that includes the incident value in association with the first management parameter (block 440). For example, the multi-platform service management system may generate a second report that includes the incident value in association with the first management parameter, as described above.

As further shown in FIG. 4, process 400 may include processing, based on the incident value being associated with the management parameter, the second report to obtain service information associated with the incident (block 450). For example, the multi-platform service management system may process, based on the incident value being associated with the management parameter, the second report to obtain service information associated with the incident, as described above.

As further shown in FIG. 4, process 400 may include generating, based on processing the second report, a third report that includes the service information, wherein the service information is associated with a second management parameter of the management parameters (block 460). For example, the multi-platform service management system may generate, based on processing the second report, a third report that includes the service information, wherein the service information is associated with a second management parameter of the management parameters, as described above. In some implementations, the service information is associated with a second management parameter of the management parameters.

As further shown in FIG. 4, process 400 may include identifying, based on the mapping, a second client parameter that is mapped to the second management parameter (block 470). For example, the multi-platform service management system may identify, based on the mapping, a second client parameter that is mapped to the second management parameter, as described above.

As further shown in FIG. 4, process 400 may include generating a fourth report that includes the service information in association with the second client parameter (block 480). For example, the multi-platform service management system may generate a fourth report that includes the service information in association with the second client parameter, as described above.

As further shown in FIG. 4, process 400 may include providing the fourth report to the client device or the client platform (block 490). For example, the multi-platform service management system may provide the fourth report to the client device or the client platform, as described above.

Process 400 may include additional implementations, such as any single implementation or any combination of implementations described below and/or in connection with one or more other processes described elsewhere herein.

In a first implementation, process 400 includes prior to identifying the first management parameter, identifying, in the data structure, the mapping, among a plurality of other mappings, based on the mapping being associated with a client identifier associated with client platform.

In a second implementation, the first report and the fourth report are associated with a particular format, wherein the particular format comprises one of a JSON format, or an XML format.

In a third implementation, the client parameters comprise at least one of a preconfigured set of JSON incident attributes associated with incident reports of a reporting tool of the client platform, or a preconfigured set of XML incident attributes associated with the incident reports of the reporting tool of the client platform.

In a fourth implementation, the management parameters comprise at least one of a preconfigured set of JSON service attributes associated with service reports of a service management interface, or a preconfigured set of XML service attributes associated with the service reports of the service management interface.

In a fifth implementation, processing the second report comprises identifying a type of the first management parameter, and determining the service information based on the incident value and the type of the first management parameter.

In a sixth implementation, the service information comprises at least one of information identifying troubleshooting instructions associated with addressing the incident, information identifying analytics data associated with occurrences of the incident by one or more client devices associated with the client platform, or an alert message associated with the analytics data and the occurrences of the incident.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
maintaining, by a device, a data structure that includes a mapping of client parameters associated with a client platform to management parameters,
wherein the client parameters comprise a preconfigured set of JavaScript object notation (JSON) incident attributes associated with incident reports of a reporting tool of the client platform;
receiving, by the device and from the client platform, a first report associated with an incident involving a client device that is associated with the client platform,
wherein the first report includes an incident value associated with a first client parameter of the client parameters;
identifying, by the device and in the mapping, a first management parameter of the management parameters that is mapped to the client parameter;
generating, by the device, a second report that includes the incident value in association with the first management parameter;
processing, by the device and based on the incident value being associated with the first management parameter, the second report to obtain service information associated with the incident;
generating, by the device and based on processing the second report, a third report that includes the service information,
wherein the service information is associated with a second management parameter of the management parameters;
identifying, by the device and based on the mapping, a second client parameter that is mapped to the second management parameter;
generating, by the device, a fourth report that includes the service information in association with the second client parameter; and
providing, by the device, the fourth report to the client device or the client platform.

2. The method of claim 1, further comprising:
prior to identifying the first management parameter, identifying, in the data structure, the mapping, among a plurality of other mappings, based on the mapping being associated with a client identifier associated with client platform.

3. The method of claim 1, wherein the first report and the fourth report are associated with a particular format,
wherein the particular format comprises one of:
a JSON format, or
an extensible markup language (XML) format.

4. The method of claim 1, wherein the client parameters comprise:
a preconfigured set of extensible markup language (XML) incident attributes associated with the incident reports of the reporting tool of the client platform.

5. The method of claim 1, wherein the management parameters comprise at least one of:
a preconfigured set of JSON service attributes associated with service reports of a service management interface, or
a preconfigured set of extensible markup language (XML) service attributes associated with the service reports of the service management interface.

6. The method of claim 1, wherein processing the second report comprises:
identifying a type of the first management parameter; and
determining the service information based on the incident value and the type of the first management parameter.

7. The method of claim 1, wherein the service information comprises at least one of:
information identifying troubleshooting instructions associated with addressing the incident;
information identifying analytics data associated with occurrences of the incident by one or more client devices associated with the client platform; or
an alert message associated with the analytics data and the occurrences of the incident.

8. A device, comprising:
one or more memories; and
one or more processors, communicatively coupled to the one or more memories, configured to:
receive, from a client platform, a first report associated with an incident involving a client device that is associated with the client platform,
identify, based on receiving the first report from the client platform, a mapping that is associated with the client platform,
wherein the mapping maps client parameters associated with the client platform with management parameters,
wherein the client parameters comprise a preconfigured set of JavaScript object notation (JSON) incident attributes associated with incident reports of a reporting tool of the client platform;
identify, in the first report, an incident value associated with a first client parameter of the client parameters;
identify, in the mapping, a first management parameter of the management parameters that is mapped to the client parameter;
generate a second report that includes the incident value in association with the first management parameter;
process, based on the incident value being associated with the first management parameter, the second report to obtain service information associated with the incident; and
perform an action associated with the service information.

9. The device of claim 8, wherein the first report comprises:
an extensible markup language (XML) file.

10. The device of claim 8, wherein the one or more processors, when processing the second report, are configured to:
identify a type of the first management parameter; and
determine the service information based on the incident value and the type of the first management parameter.

11. The device of claim 8, wherein the one or more processors, when processing the second report, are configured to:
identify a type of the first management parameter;
compare the incident value to one or more other incident values associated with the type of the first management parameter,
wherein the one or more other incident values are associated with historical incidents involving one or more other client devices associated with the client platform; and
determine the service information based on historical data associated with the historical incidents, wherein the service information includes troubleshooting instructions associated with addressing the incident according to the historical data.

12. The device of claim 8, wherein the one or more processors, when processing the report, are configured to:
store, based on the first management parameter, the incident value in a log associated with the client platform;
perform an analysis of records of the log that are associated with the first management parameter; and
determine the service information based on the analysis,
wherein the service information includes analytics data associated with occurrences of the incident that are identified in the records.

13. The device of claim 8, wherein the one or more processors, when processing the second report, are configured to:
determine a type of the first management parameter;
provide, based on the type of the first management parameter, the incident value to a user device; and
receive, from the user device, the service information
wherein the service information includes a user input from the user device that is associated with the incident.

14. The device of claim 8, wherein the one or more processors, when performing the action, are configured to:
generate, based on processing the second report, a third report that includes the service information,
wherein the service information is associated with a second management parameter of the management parameters;
identify, based on the mapping, a second client parameter that is mapped to the second management parameter;
generate a fourth report that includes the service information in association with the second client parameter; and
provide the fourth report to the client device or the client platform.

15. A non-transitory computer-readable medium storing a set of instructions, the set of instructions comprising:
one or more instructions that, when executed by one or more processors of a device, cause the device to:
receive, from a client platform, a first report associated with the client platform;
identify, in a data structure, a mapping that is associated with the client platform, wherein the mapping maps client parameters to management parameters,
wherein the client parameters comprise a preconfigured set of JavaScript object notation (JSON) incident attributes associated with incident reports of a reporting tool of the client platform;
convert the first report to a second report based on the mapping,
wherein the second report includes an incident value, for a first management parameter, that is associated with a first client parameter that is mapped to the first management parameter;
process, based on the incident value being associated with the first management parameter, the second report to obtain service information associated with the incident;
generate, based on the service information being associated with a second management parameter of the management parameters, a third report that includes the service information;
convert, based on the mapping and the second management parameter, a fourth report that includes the service information in association with a second client parameter that is mapped to the second management parameter; and
provide the fourth report to a client device or the client platform.

16. The non-transitory computer-readable medium of claim 15, wherein the first report is received via a preconfigured portal that is dedicated to the client platform.

17. The non-transitory computer-readable medium of claim 15, wherein the first report comprises at least one of:
a JSON file; or
an extensible markup language (XML) file.

18. The non-transitory computer-readable medium of claim 15, wherein the mapping is one of a plurality of mappings in the data structure that are associated with a plurality of other client platforms,
wherein the mapping is identified based on receiving the first report from the client platform.

19. The non-transitory computer-readable medium of claim 15, wherein the management parameters comprise a preconfigured set of JSON service attributes associated with service reports of a service management interface.

20. The non-transitory computer-readable medium of claim 15, wherein the client parameters comprise a preconfigured set of extensible markup language (XML) incident attributes associated with incident reports of a reporting tool of the client platform and the management parameters comprise a preconfigured set of XML service attributes associated with service reports of a service management interface.

* * * * *